G. STERLING.
HOSE-COUPLING FOR FIRE-ENGINES.

No. 195,311. Patented Sept. 18, 1877.

Attest:
Chs. F. Daniels
A B Kortup

Inventor:
George Sterling

UNITED STATES PATENT OFFICE.

GEORGE STERLING, OF TOLEDO, OHIO.

IMPROVEMENT IN HOSE-COUPLINGS FOR FIRE-ENGINES.

Specification forming part of Letters Patent No. 195,311, dated September 18, 1877; application filed July 16, 1877.

*To all whom it may concern:*

Be it known that I, GEORGE STERLING, of the city of Toledo, in the county of Lucas and State of Ohio, have invented a new and useful Device in a Hose-Coupling for Fire-Engines, which is fully set forth in the following specification and accompanying drawings, in which—

Figure 1:
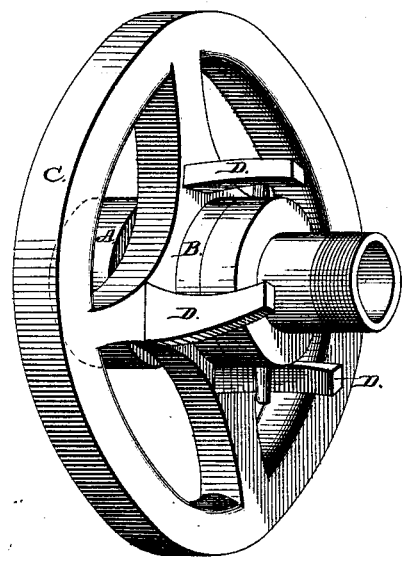
Figure 2:
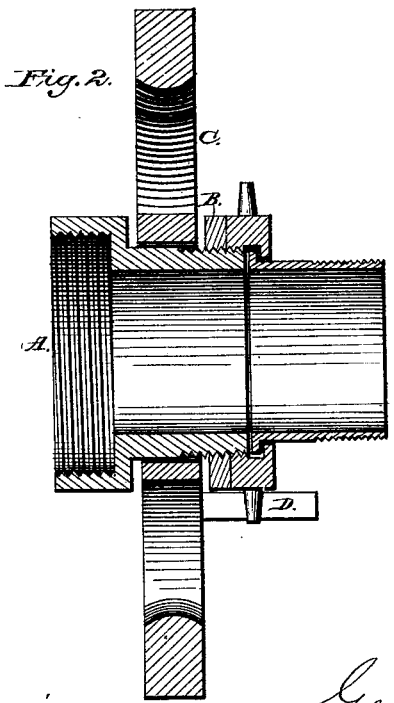

Figure 1 is a perspective view of the device, and Fig. 2 a sectional view of the same.

The object of my invention is to furnish a device by which to connect or disconnect hose to or from fire-engines, and for other purposes where hose is connected.

The device is composed of three pieces.

In the drawing, A A is the cylinder. B is the collar, securing the wheel C. D D D D are one or more prongs, straight or curved, projecting from wheel C.

The hose-coupling end of cylinder A A has a screw-thread cut to the collar B. In making a connection the hose is lifted to the cylinder A A. The wheel C is given a rotatory motion from left to right. The prongs D D D D press against the pins on the hose and force them around the cylinder A A. By turning the wheel C from right to left it disconnects the hose.

Having thus described my invention, what I claim as new, and desire to secure by Letters Patent, is—

The combination of wheel C, having prongs D D D D, with collar B, connected thereby with cylinder A A, all substantially as shown and described.

GEORGE STERLING.

Witnesses:
CHS. F. DANIELS,
A. B. KIRKUP.